United States Patent Office 3,388,231
Patented June 11, 1968

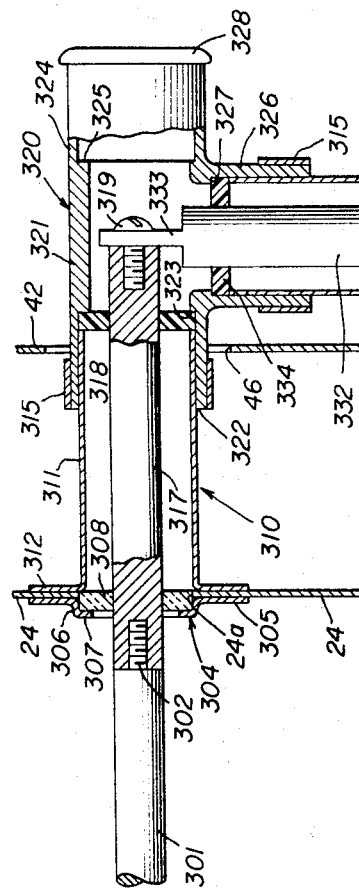
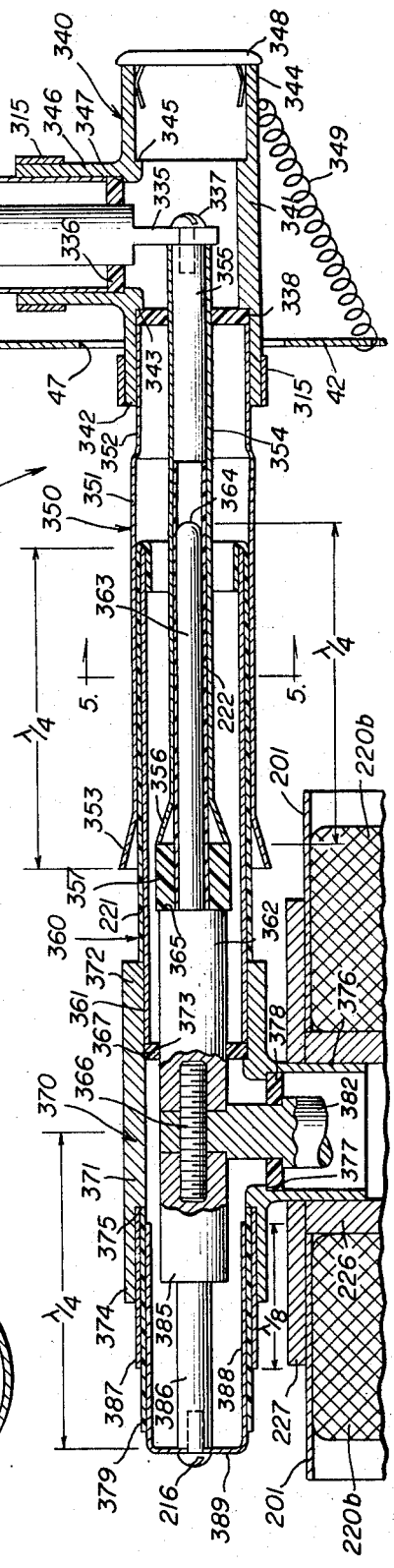
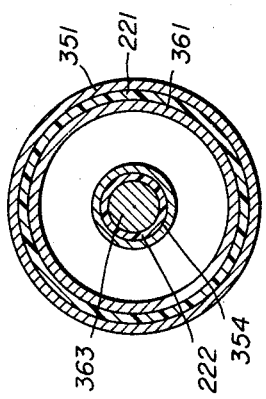
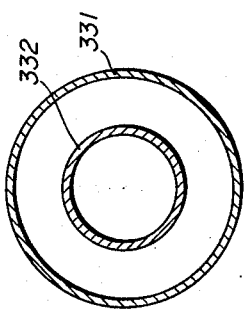
FIG. 4
FIG. 5
FIG. 6

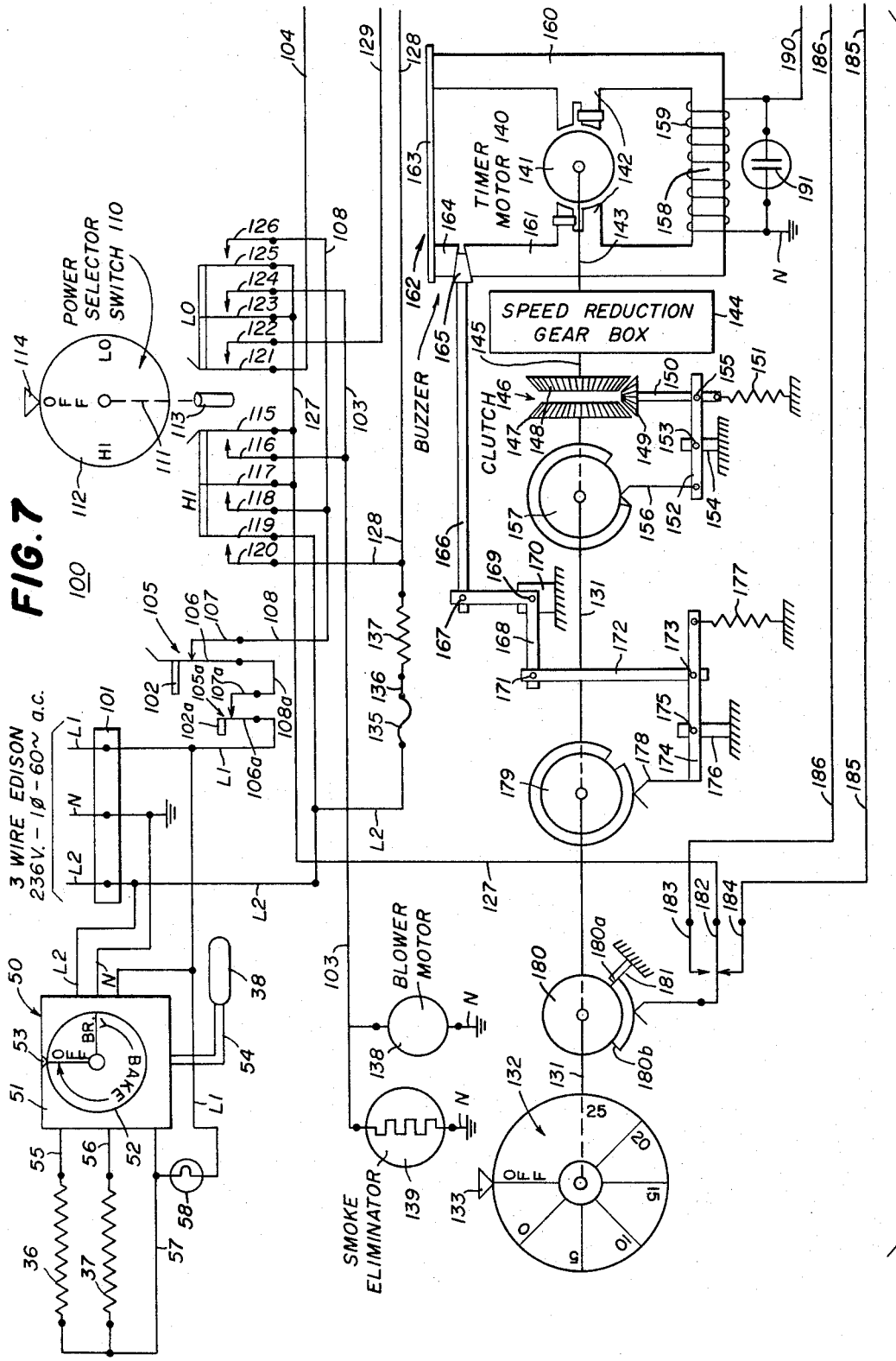

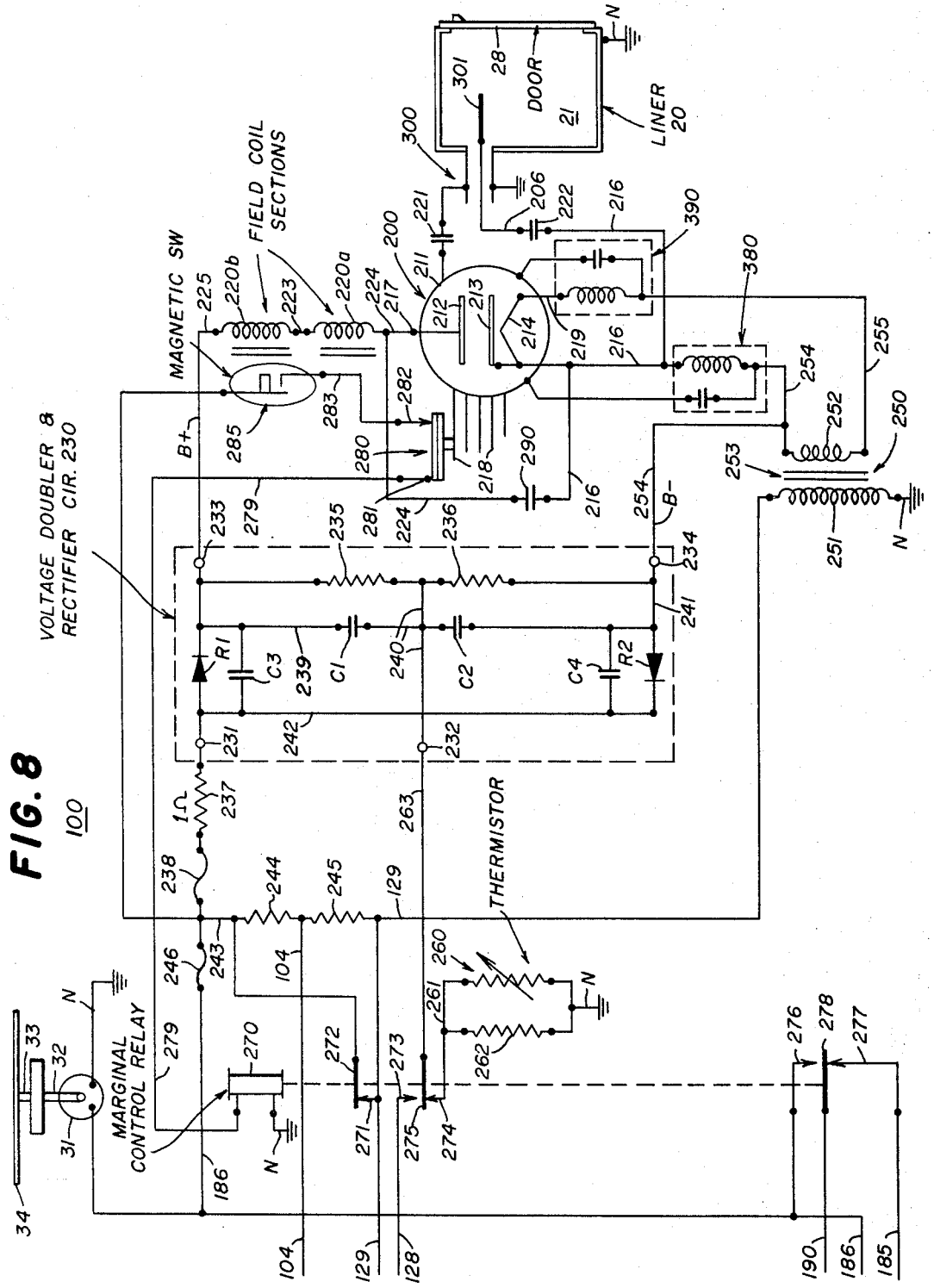

3,388,231
ELECTRONIC HEATING APPARATUS AND
MICROWAVE COUPLING STRUCTURE
AND TRANSMISSION LINE THEREFOR
James E. Staats, Louisville, Ky., assignor to General
Electric Company, a corporation of New York
Continuation-in-part of application Ser. No. 181,144,
Mar. 20, 1962. This application Nov. 23, 1966, Ser.
No. 596,519
20 Claims. (Cl. 219—10.55)

ABSTRACT OF THE DISCLOSURE

There is disclosed a combination electric and electronic range including a cooking cavity defined by a metal liner, a first machinery compartment below the liner and a second machinery compartment to the rear of the liner defined by the casing for the range and baffles arranged around the liner. The generator for electronic cooking is disposed in the lower machinery compartment and has the output thereof connected to the cooking cavity by a transmission line disposed in the machinery compartments. The transmission line is readily disassembled from the rear of the range.

---

The present application is a continuation-in-part of the copending application for United States Letters Patent of James E. Staats, Ser. No. 181,144, filed Mar. 20, 1962.

The present invention relates to an improved electronic heating apparatus and to an improved microwave coupling structure and an improved transmission line forming a part thereof.

It is a general object of the invention to provide a new and improved electronic heating apparatus possessing improved cooking characteristics in that the cooking cavity forming a part thereof is better isolated from the power supply thereof and the changes in operating temperatures associated with the power supply, all while providing a structure that is simple and economical in construction and arrangement.

Another object of the invention is to provide an improved electronic heating apparatus of the type set forth powered by a generator of ultra-high frequency electromagnetic wave energy, the apparatus including an improved transmission line interconnecting the generator and the cooking cavity, the transmission line having good eletcrical characteristics while being exceedingly economical in construction and arrangement, the transmission line also including an improved coupling structure for connecting one end of the transmission line to the generator.

Another object of the invention is to provide an improved electronic heating apparatus comprising an upstanding box-like metal casing, a box-like metal liner disposed in the upper portion of the casing and defining a cooking cavity, baffle structure disposed in the casing and spaced from the liner and extending across the casing and cooperating therewith to define a bottom apparatus compartment below the liner and a rear apparatus compartment behind the liner, a generator disposed in the bottom apparatus compartment for supplying ultra-high frequency electromagnetic wave energy, a transmission line interconnecting the generator and the cooking cavity and extending through the bottom apparatus compartment and the rear apparatus compartment, and means for forcing a stream of air into the casing and through the bottom apparatus compartment and across the generator and out of the casing to effect cooling of the generator, the baffle structure shielding the liner from the stream of air in the bottom apparatus compartment to facilitate the maintenance of a more nearly uniform temperature distribution in the cooking cavity.

In connection with the foregoing object, it is another object of the invention to provide an improved electronic heating apparatus wherein the generator includes a crossed-field electron discharge device and a voltage doubler and rectifier circuit therefor, the baffle structure being formed of metal and cooperating with the casing completely to surround the generator to provide a protective housing for the generator.

Another object of the invention is to provide an improved electronic heating apparatus of the type set forth wherein the baffle structure includes a first baffle member disposed below the liner and spaced therefrom and a second baffle member disposed behind the liner and spaced therefrom, the transmission line including a top section coupled to the cooking cavity and extending rearwardly behind the second baffle member and a bottom section coupled to the generator and extending rearwardly behind the second baffle member and a rear section interconnecting the top and bottom sections and also disposed behind the second baffle member.

In connection with the foregoing object, another object of the invention is to provide an improved electronic heating apparatus of the type set forth wherein the baffle members are formed of metal, the first baffle member extending rearwardly to but spaced from the second baffle member to minimize the transfer of heat therebetween, the second baffle member extending downwardly below the first baffle member, both the top and bottom sections of the transmission line extending rearwardly through the second baffle member.

Another object of the invention is to provide in an electronic heating apparatus of the type set forth a transmission line interconnecting the generator and the cooking cavity and including a top section coupled to the cooking cavity and a bottom section coupled to the generator and a rear section connecting top and bottom sections, the top transmission line section including a first portion mounted on the liner and a second portion telescopically arranged with the first portion and extending rearwardly therefrom into the rear apparatus compartment, the bottom transmission line section including a first portion mounted on the generator and the second portion telescopically associated with the first portion and extending rearwardly therefrom and into the rear apparatus compartment, the rear transmission line section being connected to the second portions of the top and bottom transmission line sections to provide therewith a removable transmission line assembly, the casing having a removable closure member in the rear thereof accommodating the rearward movement of the removable transmission line assembly that serves to disconnect the assembly from the first portions of the top and bottom transmission line sections.

In connection with the foregoing object, another object of the invention is to provide in the bottom transmission line section outer and inner conductors with the second portions telescopically overlapping the first portions and having the outer ends thereof outwardly flared to facilitate insertion thereof over the associated first portions, there preferably being means resiliently urging the removable transmission line assembly into the assembled position with respect to the first portions of the top and bottom transmission line sections.

A further object of the invention is to provide an improved transmission line for use in an electronic heating apparatus of the type set forth, the improved transmission line being formed from a plurality of copper tubes, a plurality of interconnecting T's, a plurality of inner conductors and a plurality of clamps interconnecting the tubes and the T's, whereby to form the transmission line of essentially standard parts that are of simple, inexpensive and standard construction.

Further features of the electronic heating apparatus pertain to the particular arrangement of the parts of the electronic heating apparatus and of the transmission line and coupling assembly forming a part thereof, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 4 is a fragmentary view in vertical section through the transmission line forming a part of the apparatus of FIGS. 1 and 2 and interconnecting the device of FIG. 3 to the cooking cavity of the apparatus;

FIG. 5 is an enlarged view in vertical section along the line 5—5 of FIG. 4;

FIG. 6 is an enlargd view in section along the line 6—6 of FIG. 4; and

Figure 1:
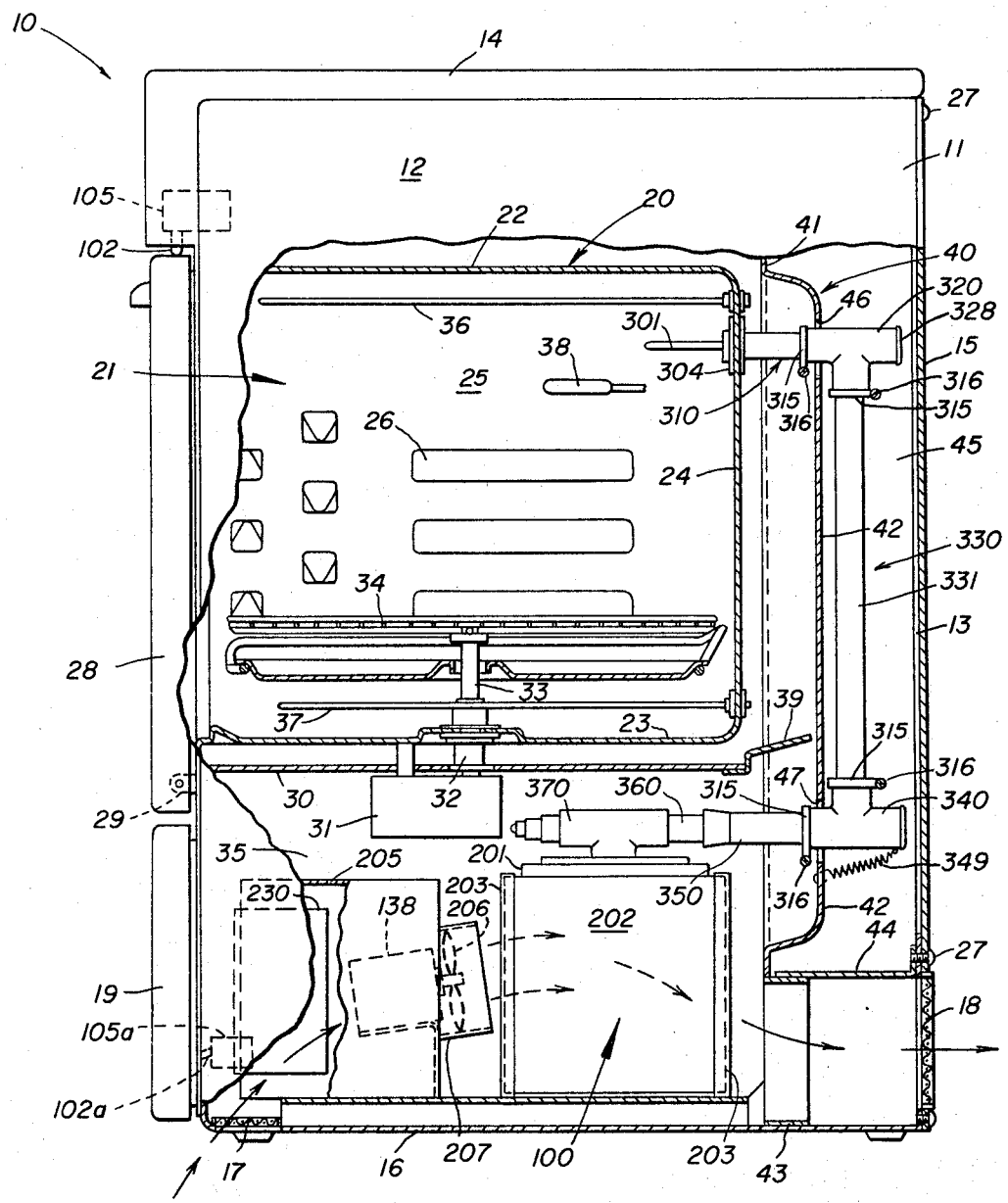
FIGURE 1 is a side elevational view with certain portions broken away of an electronic heating apparatus made in accordance with and embodying the principles of the present invention.
Figure 2:
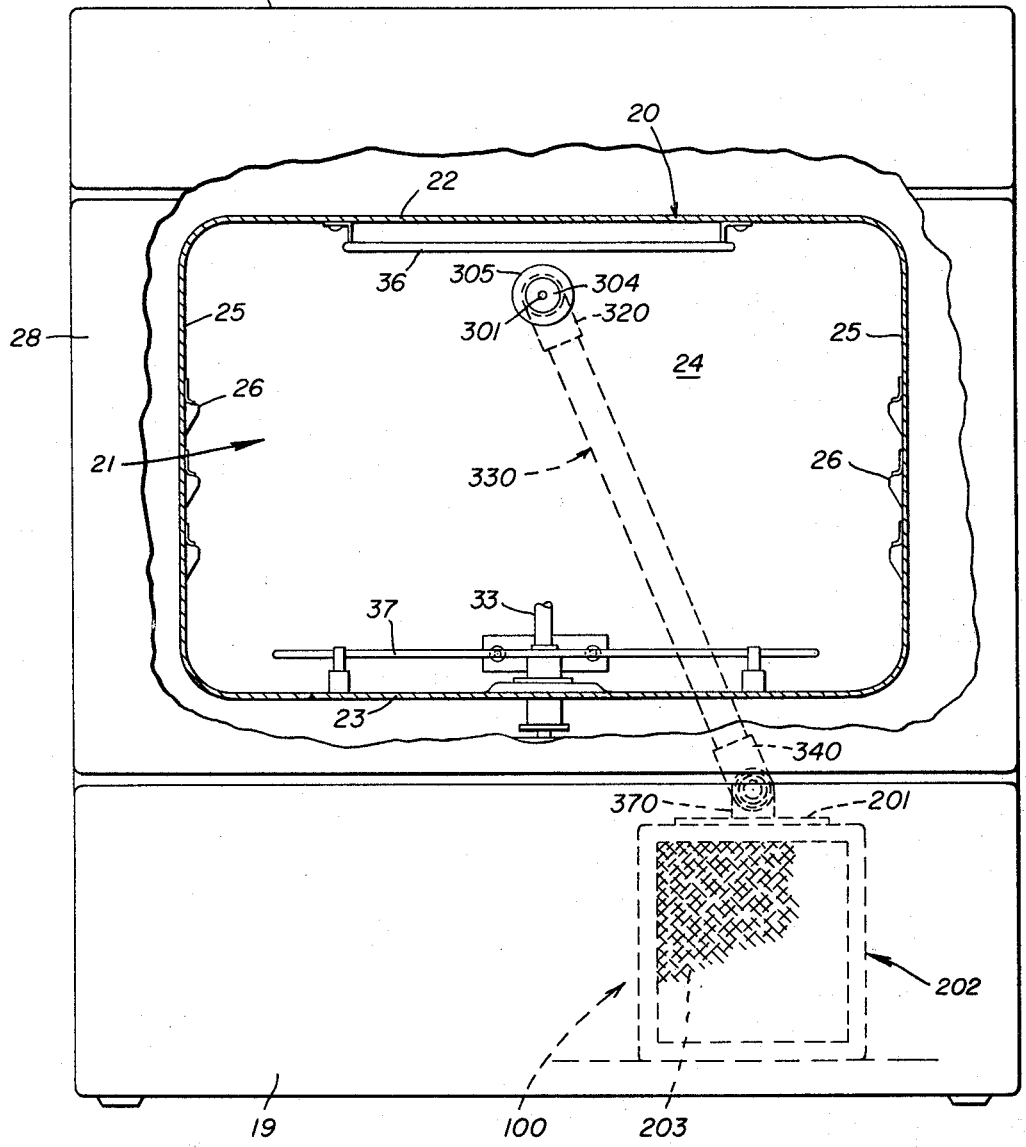
FIG. 2 is a front elevational view with certain parts broken away of the apparatus of FIG. 1.

FIGS. 7 and 8 taken together, and respectively arranged left and right in end-to-end relationship, comprise a diagrammatic illustration of a control and power supply system associated with the crossed-field discharge device and cooperating therewith to form a generator to supply ultra-high frequency electromagnetic energy to the apparatus of FIGS. 1 and 2.

Referring now to FIGS. 1 and 2 of the drawings, the electronic heating apparatus 10 there illustrated, and embodying the features of the present invention, is in the form of a combination electric and electronic range that is especially designed for home use. More particularly, the range 10 comprises an upstanding substantially box-like casing 11 formed of steel and including a pair of side walls 12, a rear wall 13 having a removable closure member or panel 15 disposed therein, and a top wall 14 and a bottom wall 16, the removable panel 15 being removably held in place by a plurality of screws 27. The casing 11 houses in the upper central portion thereof a metal liner 20 defining a heating or cooking cavity 21 therein, the metal liner 20 preferably being formed of steel, and essentially comprising a box-like structure provided with a top wall 22, a bottom wall 23, a rear wall 24, and a pair of opposed side walls 25; whereby the liner 20 is provided with an upstanding front opening into the heating cavity 21 defined therein. Further, the casing 11 is provided with a front door 28 arranged in a front opening formed therein and cooperating with the front opening provided in the liner 20, the front door 28 being mounted adjacent to the lower end thereof upon associated hinge structure 29; whereby the front door 28 is movable between a substantially vertical closed position and a substantially horizontal open position with respect to the front opening provided in the liner 20.

An electric heating unit 36 is arranged in the upper portion of the heating cavity 21 adjacent to and below the top wall 22, and an electric heating unit 37 is arranged in the lower portion of the heating cavity 21 adjacent to and above the bottom wall 23; which electric heating units 36 and 37 are utilized in the carrying out of conventional baking and broiling cooking operations in the heating cavity 21, as explained more fully hereinafter. Also, a temperature sensing bulb 38 is arranged in a pocket provided in one of the side walls 25; which temperature sensing bulb 38 forms a part of an oven switch and temperature controller and is utilized in carrying out the previously mentioned conventional baking and broiling operations in the heating cavity 21. The side walls 25 of the liner 20 further carry thereon a plurality of shelf supports 26 for the supporting of shelves (not shown) that in turn support items to be cooked within the heating cavity 21. There also is provided below the front door 28 a lower front panel 19 that closes a front opening in the lower portion of the casing 11, the bottom wall 16 further being provided with a reticulated member or screen 17 and the lower portion of the rear wall 13 being provided with a reticulated member or screen 18, the screens 17 and 18 permitting the passage of air through the lower portion of the casing to cool the electronic apparatus therein as will be described more fully hereinafter.

Disposed below the liner 20 and spaced therefrom is a generally horizontally arranged lower baffle 30 extending laterally across the casing 11 between the side walls 12 thereof and extending rearwardly from the front of the casing 11 to a point spaced forwardly of the rear wall 13, the baffle 30 in cooperation with the casing 11 defining a bottom machinery compartment 35 in the lower portion of the casing 11, the lower front panel 19 being removable to provide access to the bottom machinery compartment 35.

Mounted on the underside of the baffle 30 is an electric motor 31 having an output drive shaft 32 including a reduced portion 33 extending upwardly into the liner 20 and supporting thereon a turntable 34 formed of expanded sheet metal and arranged in the lower portion of the heating cavity 21. The turntable 34 is mounted for rotation and upon operation of the motor 31 is adapted to support food to be heated or cooked in the electronic operation that is carried out in the heating cavity 21, as explained more fully hereinafter. The motor 31 has an associated gear train (not shown) that reduces the speed of the shaft 33 to approximately 6 r.p.m.

A rear baffle 40 is provided to the rear of the liner 20 and extends across the casing 11 between the side walls 12 thereof, the baffle 40 including a main wall 41 carrying centrally thereof a rearwardly offset wall 42 that is in general horizontal alignment with the rear of the liner 20 and spaced rearwardly therefrom. Disposed in the lower portion of the main wall 41 is an opening around which is disposed a flange 43 connecting with an air duct 44 that communicates with the screen 18 in the rear wall 13 of the casing 11. It further will be noted that the bottom baffle 30 carries on the rear thereof an upwardly and rearwardly extending baffle section 39 that extends toward the offset wall 42 but is spaced therefrom, the baffles 30 and 40 being formed of metal, such as steel, whereby the spacing between the baffle section 39 and the rear baffle 40 minimizes the conduction of heat therebetween during the operation of the range 10. The rear baffle 40 cooperates with the casing 11 to provide a rear machinery compartment 45, the rear machinery compartment 45 being disposed behind the liner 20 and access thereto being provided through the removable panel 15 that covers the opening in the rear wall 13 described above.

Figure 3:
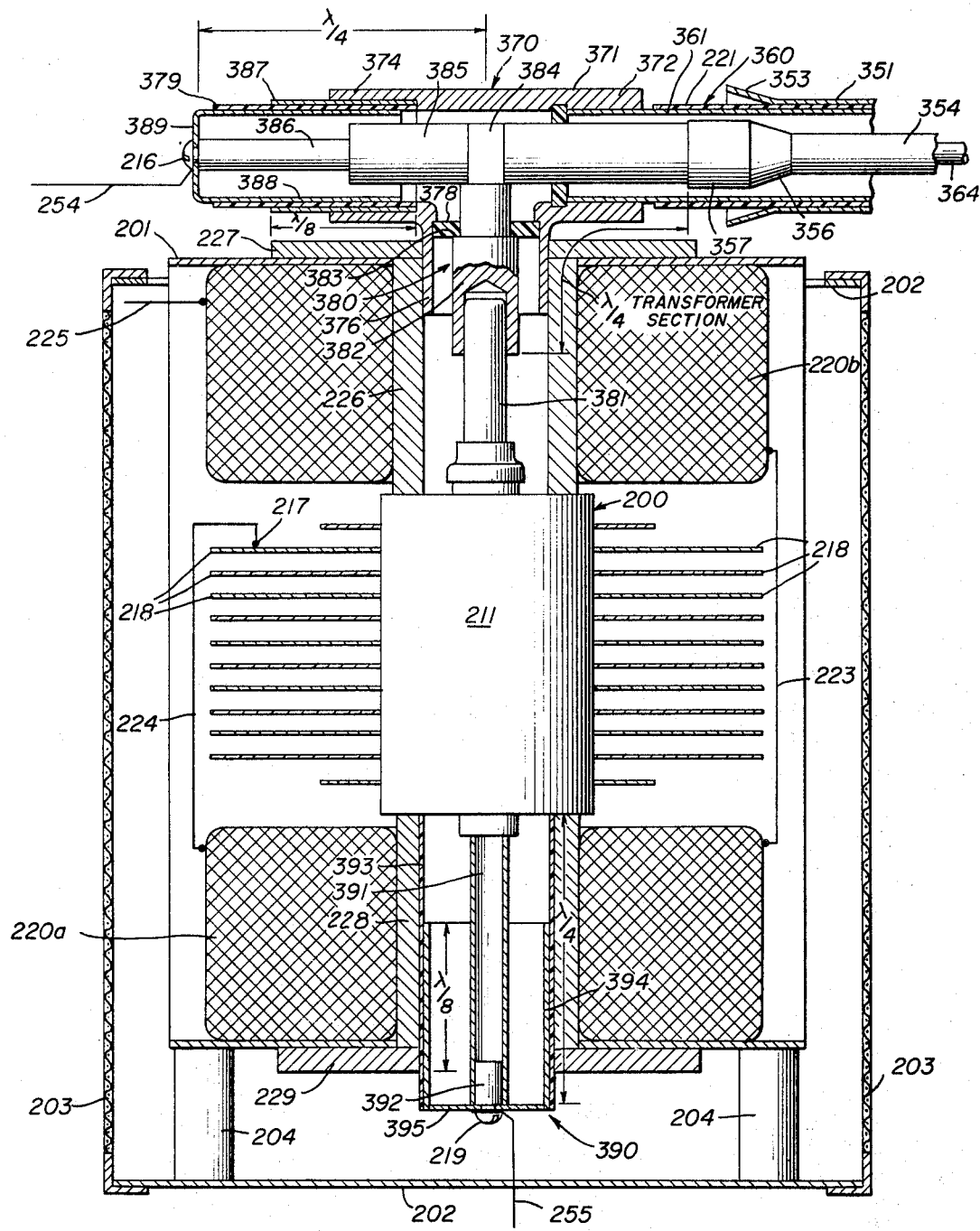
FIG. 3 is a fragmentary view on an enlarged scale in vertical section of a crossed-field discharge device forming a part of the generator for the apparatus of FIGS. 1 and 2.

There is arranged to the right (as viewed in FIG. 2) of the bottom machinery compartment 35 a generator 100 for supplying ultra-high frequency electromagnetic wave energy for electronic cooking within the cooking cavity 21, the generator 100 including a crossed-field electronic discharge device 200 of the construction and arrangement disclosed in the copending application of James E. Staats, Ser. No. 559,267, filed June 21, 1966. Referring to FIGS. 1 to 3, it will be seen that the device 200 is disposed within a box-like structure or casing 201 that extends completely about the device 200 but is open on two opposed sides thereof, the sides disposed to the left and right in FIG. 3, the device 200 and the associated parts therefor being mounted within and electrically connected to the casing 201. As will be explained more fully hereinafter, high operating D.C. potentials are present on the casing 201, whereby it is desirable electrically to isolate and shield the casing 201, and to this end a second box-like structure 202 has been provided that surrounds the casing 201 and is also provided on an opposed pair of sides thereof with openings in alignment with the opposed open sides of the casing 201, all to accommodate the passage of air through the casing 201 and the box-like structure 202 to cool the device 200 and the associated parts housed therein. However, in order to prevent contact of the user with the casing 201 and the device 200 disposed therein, reticulated metal covers 203 are provided for covering the openings in the opposed sides of the box-like structure 202, the covers 203 permitting passage of air therethrough and thus through the casing 201 and the structure 202 while preventing contact of a user with the casing 201 and the parts disposed therein that carry the high operating D.C. potentials. Further, the casing 201 is mounted upon insulators 204 carried by the structure 202, thereby electrically to insulate the casing 201 from the structure 202.

As viewed in FIG. 1, the structure 202 and the casing 201 disposed therein are disposed to the rear of the bottom apparatus 35, and as may be best seen in FIG. 2 are disposed to the right within the bottom apparatus compartment 35 when the range 10 is viewed from the front. In order to provide cooling air for passage through the reticulated covers 203 and across the device 200, there has been provided an open ended housing 205 disposed to the left in FIG. 1 or in front of the structure 202 and housing therein at least a part of a voltage doubler and rectifier circuit 230 that supplies D.C. operating potentials to the device 200 and also houses therein a fan 206 powered by a motor 138 within the housing 205, an air duct 207 being provided about the fan 206 to direct air therefrom into the structure 202 and into the casing 201 and about the device 200. More specifically, the fan 206 operates to draw air through the screen 17 at the bottom of the apparatus compartment 35, the air being formed into a stream by the housing 205 and passed over the rectifier 230, the motor 138 and through the air duct 207 into the structure 202; the air stream within the structure 202 passes into the casing 201 and about the device 200 and cooling fins 218 disposed thereon and passes therefrom and into the air duct 44 to be discharged through the screen 18 in the rear wall 13 of the casing 11.

In accordance with the present invention, the air stream generated by the fan 206 is used to cool all of the various parts of the generator 100, and specifically the crossed-field discharge device 200 and the voltage doubler and rectifier circuit 230 associated therewith. To this end the housing 205 and the air duct 207 and the air duct 44 have been provided so as to concentrate the air stream upon the parts noted, all while attempting to deflect the air stream away from the baffles 30 and 40. The baffles 30 and 40 further protect the liner 20 and the cooking cavity 21 disposed therein from the air stream thus generated so as to maintain more uniform cooking conditions within the cooking cavity 21 and thus to improve the cooking therein.

Referring now particularly to FIGS. 3, 7 and 8, the control and power supply system for the range 10 there illustrated will be described in greater detail, it being pointed out that certain of the parts thereof are of the fundamental connection and arrangement disclosed in the previously mentioned Staats application, Ser. No. 181,144, the network including the crossed-field discharge device 200 of the construction and arrangement disclosed in the previously mentioned Staats application Ser. No. 559,267. Specifically, the device 200 comprises a substantially cylindrical metal envelope 211, structure 212 enclosed in the envelope 211 and constituting an anode, structure 213 enclosed in the envelope 211 and constituting a cathode, a heater 214 enclosed in the envelope 211 and operatively associated with the cathode 213, an output terminal 215 connected to the envelope 211, an output terminal 216 directly connected to the cathode 213, an input terminal 217 directly connected to the anode 212 and extending out of the envelope 211 and an input terminal in the form of the terminal 216 directly connected to the cathode 213 extending out of the envelope 211.

The device 200 is operative to supply ultra-high frequency of about 915 mc., with a power output at the output terminals in the general range 50 to 800 watts. The device is arranged to supply the RF power for cooking and to this end a transmission line 300 extends from the device 200 to the cooking cavity 21, the transmission line 300 being of the coaxial type including an inner conductor and an enclosing outer conductor electrically insulated therefrom. Both of the output terminals of the device 200 are at a substantial voltage D.C. with respect to ground potential, so that the output terminals are electrically insulated from ground potential, as well as from each other. One of the output terminals is coupled by a capacitor 221 to the adjacent end of the outer output conductor, and the other output terminal is coupled by a capacitor 222 to the adjacent end of the inner output conductor, the remote end of the inner conductor projecting as an antenna 301 into the oven cavity 21; the remote end of the outer conductor is electrically connected to the metal liner 20. Thus the RF power produced by operation of the device 200 is radiated from the antenna 301 into the cooking cavity 21, so as to produce cooking effects upon food arranged therein, all in a conventional manner. In the device 200, one terminal of the heater 214 is electrically connected to a terminal 216, and the other terminal of the heater 214 is electrically connected to a heater terminal 219 that projects out of the envelope 211. Further the device 200 comprises a composite field winding including two sections 220a and 220b connected in series relation by a conductor 223. The input terminal 217 that is connected to the anode 212 of the device 200 is connected by a conductor 224 to the free terminal of the field winding section 220a, and the free terminal of the field winding section 220b is connected to a conductor 225.

Also, the control and power supply system comprises an insulating terminal block 101 terminating a source of power supply of the 3-wire Edison type and including a neutral line N that is electrically connected to ground potential and a pair of side lines L1 and L2 that are electrically insulated from each other and from the neutral line N. Operatively associated with the front door 28 of the range 10 is latching mechanism indicated at 102, which latching mechanism 102 is selectively operative into latch and unlatch positions with respect to the liner 20, when the front door 28 is moved between its closed and open positions with respect to the cooperating front opening. Associated with the latching mechanism 102 is a door latch switch 105 that includes a pair of switch springs 106 and 107. In the arrangement, the door latch switch 105 is selectively operated between closed and open positions in response to the operation of the latching mechanism 102 into its respective latch and unlatch positions. Specifically, operation of the latching mechanism 102 into its latch position operates the door latch switch 105 into its closed position, moving the switch spring 106 to engage the switch spring 107. In the arrangement, the switch spring 106 terminates a conductor 108a and the switch spring 107 terminates a conductor 108.

Operatively associated with the lower front panel 19 is latching mechanism indicated at 102a and a door latch switch 105a that includes a pair of latch springs 106a and 107a. In the arrangement, the latch switch 105a is selectively operated between closed and open positions in response to the operation of the latching mechanism 102a into its respective latch and unlatch positions. Specifically, the switch spring 106a terminates the line conductor L1 and the switch spring 107a terminates the conductor 108a.

Further, the system comprises an oven switch and temperature controller 50 of conventional construction and arrangement and including a casing 51 carrying a manually operable dial 52 cooperating with an associated index marker 53. The dial 52 comprises an "off" position, a variable "bake" position corresponding to an operating temperature range, and a "broil" position. The casing 51 houses a power switch, not shown, that is selectively set by the dial 52 and that is selectively operated by the temperature sensing bulb 38 through an associated capillary tube 54. Further, the controller 50 comprises three input terminals to which the line conductors L1 and L2 and the neutral conductor N are respectively connected, as well as three output terminals to which three conductors 55, 56 and 57 are respectively connected. The two terminals of the upper heating unit 36 are respectively connected to the conductors 55 and 57, and the two terminals of the lower heating unit 37 are respectively connected to the conductors 56 and 57, an indicator light 58 being also connected to the conductors L1 and 57.

A power selector switch 110 is incorporated in the control and power supply system for the device 200; which selector switch 110 comprises a rotatable operating shaft 111, a manual dial 112 operatively connected to the outer end of the shaft 111 and an insulator 113 operatively connected to the inner end of the shaft 111. The power selector switch 110 has off, high and low positions; whereby the dial 112 carries corresponding legends "OFF," "HI" and "LO"; and which legends cooperate with an associated stationary marker 114. Also, the power selector switch 110 comprises a set of high power switch springs 115, 116, 117, 118, 119 and 120, and a set of low power switch springs 121, 122, 123, 124, 125 and 126; which sets of switch springs are selectively operated by the cooperating insulator 113. Specifically; when the dial 112 occupies its "OFF" position, the pairs of switch springs 115, 116 and 117, 118 and 119, 120 are disengaged, and the pairs of switch springs 121, 122 and 123, 124 and 125, 126 are disengaged. When the dial 112 is rotated into its "HI" position, the insulator 113 actuates the switch springs 115 and 117 and 119 to engage the switch springs 116 and 118 and 120, respectively. When the dial 112 is rotated into its "LO" position, the insulator 113 actuates the switch springs 121 and 123 and 125 to engage the switch springs 122 and 124 and 126, respectively. In the arrangement, the switch springs 115 and 117 and 123 and 125 commonly terminate a conductor 127, the switch springs 116 and 124 commonly terminate a conductor 103, the switch springs 118 and 126 commonly terminate the conductor 108, the switch spring 119 terminates the line conductor L2, the switch spring 120 terminates a conductor 128, the switch spring 121 terminates a conductor 104 and the switch spring 122 terminates a conductor 129.

Further, the circuit network comprises a timer 130 which includes a rotatably mounted operating shaft 131 carrying a manually operable dial 132 on the outer end thereof; which dial 132 carries the indices "OFF" and the numerical indices "0," "5," "10," etc., and "25"; which indices cooperate with a stationary index marker 133. Also, the timer 130 comprises a timer motor 140 of the synchronous or clock type, including a rotor 141 and a cooperating pair of pole pieces 142, the rotor 141 being rigidly secured to a rotatably mounted operating shaft 143. The operating shaft 143 is operatively connected to a speed reduction gear box, indicated at 144; which gear box 144 is provided with an output shaft 145. The operating shaft 131 and the output shaft 145 are arranged in longitudinal axial alignment with each other and are selectively interconnected by clutch mechanism 146 including two longitudinally spaced-apart gears 147 and 148 rigidly connected to the adjacent ends of the shafts 131 and 145, respectively, as well as a pinion 149 carried by a vertically movable stub shaft 150; which pinion 149 is adapted to engage the two gears 147 and 148 when the clutch mechanism 146 occupies its clutch position; and which pinion 149 is adapted to disengage the two gears 147 and 148 when the clutch mechanism 146 occupies its declutch position. The stub shaft 150 is biased by a cooperating coil spring 151 into a declutch position, so as to move the pinion 149 vertically into its declutch position disengaging the gears 147 and 148. The stub shaft 150 is moved vertically against the bias of the coil spring 151 into a clutch position, so as to move the pinion 149 vertically into its clutch position engaging the gears 147 and 148, by a cooperating lever 152; which lever 152 is pivotally mounted at the intermediate portion thereof, as indicated at 153, upon a stationary support 154; and which lever 152 is pivotally connected at one end thereof as indicated at 155 to the stub shaft 150. The other end of the lever 152 carries a follower 156 which rides a cooperating cam 157 rigidly secured to the operating shaft 131.

The timer motor 140 further comprises magnetic yoke structure including an arm 158 carrying a winding 159. The opposite ends of the arm 158 are respectively connected to two legs 160 and 161 that respectively carry the two pole pieces 142 that are operatively associated with the rotor 141. The leg 160 projects beyond the adjacent pole piece 142 and carries at the outer end thereof a buzzer 162 that includes a metal spring 163 formed of magnetic material, one end of the spring 163 being rigidly secured to the adjacent end of the leg 160, and the free end of the spring 163 carrying an armature 164 disposed in cooperating spaced-apart relation with the adjacent end of the leg 161. Also, the buzzer 162 includes a wedge 165 formed of magnetic material and arranged in cooperating relation between the armature 164 and the adjacent end of the leg 161; which wedge 165 is carried upon the outer end of a rod 166 mounted for longitudinal movements substantially parallel to the operating shaft 143. The inner end of the rod 166 is pivotally connected as indicated at 167, to one arm of a bell crank 168 that is pivotally supported, as indicated at 169, upon an external support 170. Another arm of the bell crank 168 is pivotally connected as indicated at 171, to one end of a rod 172; and the other end of the rod 172 is pivotally connected, as indicated at 173, to the intermediate portion of a lever 174. Another intermediate portion of a lever 174 is pivotally connected, as indicated at 175, to an external support 176. One end of the lever 174 is biased into a given position by a cooperating coil spring 177; and the other end of the lever 174 carries a follower 178 that rides a cooperating cam 179 rigidly secured to the operating shaft 131.

Also, the operating shaft 131 carries an insulating cam 180 rigidly affixed thereto; which cam 180 cooperates with an external stop 181. Moreover, the cam 180 cooperates with a follower switch spring 182 riding the same; which switch spring 182 cooperates with two other switch springs 183 and 184. In the arrangement, the switch springs 182, 183 and 184 respectively terminate the conductor 127, a conductor 186 and a conductor 185.

When the dial 132 occupies its "OFF" position: one shoulder 180a of the cam 180 engages the limit stop 181; the cam 180 actuates the switch spring 182 to disengage the switch spring 183 and to engage the switch spring 184; the cam 179 actuates the follower 178, so as to rotate the lever 174 in the counterclockwise direction about the pivot 175, as shown in FIG. 1, so that the rod 172 actuates the bell crank 168 in order to actuate the rod 166 for the purpose of projecting the wedge 165 into a keeping position and between the armature 164 and the adjacent end of the leg 161; and the cam 157 actuates the follower 156, so as to release the lever 152 in order to allow the coil spring 151 to rotate the lever 152 in a clockwise direction about the pivot 153, as shown in FIG. 1, so that the stub shaft 150 moves downwardly to move the pinion 149 into its declutch position to disengage the two gears 147 and 148 for the purpose of declutching the shaft 145 from the operating shaft 131.

When the dial 132 occupies its "0" position; the one shoulder 180a of the cam 180 disengages the limit stop 181; the cam 180 actuates the switch spring 182 to disengage the switch spring 183 and to engage the switch spring 184; the cam 179 actuates the follower 178, so as to release the lever 174 in order to allow the coil spring 177 to rotate the lever 174 in the clockwise direction about the pivot 175, as shown in FIG. 1, so that the rod 172 actuates the bell crank 168 in order to actuate the rod 166 for the purpose of withdrawing the wedge 185 into a releasing position and from between the armature 164 and the adjacent end of the leg 161; and the cam 157 actuates the follower 156, so as to release the lever 152 in order to allow the coil spring 151 to rotate the lever 152 in the clockwise direction about the pivot 153, as shown in FIG. 1, so that the stub shaft 150 moves downwardly to move the pinion 149 into its declutch position disengaging the two gears 147 and 148 for the purpose of declutching the shaft 145 from the operating shaft 131.

When the dial 132 occupies any of its numerical positions "1", "5," "10," etc.: the one shoulder 180a disengages the limit stop 181; the cam 180 actuates the switch spring 182 to engage the switch spring 183 and to disengage the switch spring 184; the cam 179 actuates the follower 178, so as to rotate the lever 174 in the counter-clockwise direction about the pivot 175, as shown in FIG. 1, so that the rod 172 actuates the bell crank 168 in order to actuate the rod 166 for the purpose of projecting the wedge 165 into its keeping position and between the armature 164 and the adjacent end of the leg 161; and the cam 157 actuates the follower 156, so as to rotate the lever 152 in the counterclockwise direction about the pivot 153, as shown in FIG. 1, so that the stub shaft 150 moves upwardly to move the pinion 149 into its clutch position engaging the two gears 147 and 148 for the purpose of clutching the shaft 145 to the operating shaft 131.

The winding 159 of the timer motor 140 is connected across the neutral line N and a conductor 190; and a pilot lamp 191 of the neon type is bridged across the winding 159 and between the neutral conductor N and the conductor 190. When the conductor 190 is connected to the line L1, via a circuit traced hereinafter, the winding 159 is energized in an obvious manner, and the pilot lamp 191 glows to indicate the energization of the winding 159. Energization of the winding 159 casues rotation of the rotor 141 in a known manner; and it may be assumed that the same is rotated at a synchronous speed of 3600 r.p.m. Also, it may be assumed that the gear box 144 causes rotation of the shaft 145 at a speed of 1 revolution per 40 minutes, as indicated by the constructional example of the dial 132, so that the dial 132 is rotated ½ revolution per 20 minutes in accordance with the legends "0," and "20" carried thereby. Specifically, rotation of the shaft 143 at 3600 r.p.m. causes the gear box 144 to drive the shaft 145 at a speed of 1 revolution per 40 minutes; which rotation of the shaft 145 is transmitted to the operating shaft 131 only when the clutch 146 is operated into its clutch position causing rotation of the operating shaft 131 in the counterclockwise direction, as viewed in FIG. 1, and at the speed of 1 revolution per 40 minutes; and which rotation of the shaft 145 is not transmitted to the operating shaft 131 when the clutch 146 is operated into its declutch position. Also, energization of the winding 159 causes magnetic "leakage" of flux via the path between the legs 160 and 161 including the spring 163, the armature 164 and the wedge 165. When the wedge 165 occupies its projected position between the armature 164 and the adjacent end of the leg 161, the armature 164 is restrained against chatter, so that no substantial audible noise is produced and the buzzer 162 may be considered to be "turned off." On the other hand, when the wedge 165 occupies its withdrawn position from between the armature 164 and the adjacent end of the leg 161, the armature 164 is released to chatter, so that the same vibrates into alternate engagement and disengagement with the wedge 165, in order to produce an audible noise and the buzzer 162 may be considered to be "turned on."

In the timer 130, rotation of the dial 132 into its "25" minute position causes the other shoulder 180b to engage the limit stop 181, so as to prevent clockwise rotation thereof beyond its "25" minute position mentioned. In passing, it is noted that any suitable angle less than 360° of rotation may be provided between the two shoulders 180a and 180b; and this angle may correspond to any desired maximum settable time interval depending upon the gear box 144. Thus, the "25" minute position of maximum settable time interval is of no significance and is only illustrated by way of an example.

Further considering the circuit network, the crossed-field discharge device 200 is supplied with D.C. power from an associated voltage doubler and rectifier curcuit or unit 230 that comprises a pair of input terminals 231, 232 and a pair of output terminals 233, 234, as well as a pair of capacitors C1 and C2, that are preferably of the electrolytic type, and a pair of rectifying diodes R1 and R2, that are preferably of the silicon-crystal type. Also, the circuit 230 comprises a pair of bleeder or stabilizing resistors 235 and 236 connected in series with each other and across the output terminals 233, 234, and a surge limiting resistor 237 and a current protective device in the form of a thermal fuse 238. One terminal of the capacitor C1 is connected by a conductor 239 to the output terminal 233; the other terminal of the capacitor C1 is connected by a conductor 240 to one terminal of the capacitor C2; and the other terminal of the capacitor C2 is connected by a conductor 241 to the output terminal 234. The input terminal 231 is connected by a conductor 242 to the positive pole of the diode or rectifier R1 and to the negative pole of the diode or rectifier R2; the negative pole of the rectifier R1 is connected to the conductor 239; and the positive pole of the rectifier R2 is connected to the conductor 241. The input terminal 231 is connected to one terminal of the surge resistor 237 and the other terminal of the surge resistor 237 is connected to one terminal of the fuse 238. The other terminal of the fuse 238 is connected to a conductor 243; a current protective device in the form of a thermal fuse 246 interconnects the conductors 186 and 243. The output terminal 233 is connected to a B+ conductor; the output terminal 234 is connected to a B− conductor. There also is provided in parallel with the rectifier R1, a capacitor C3 and in parallel with the rectifier R2 a capacitor C4, the capacitors C3 and C4 bypassing RF interference around the rectifiers R1 and R2, respectively.

The circuit network further comprises a transformer 250 provided with a primary winding 251 and a secondary winding 252, as well as a coupling magnetic core 253. One terminal of the primary winding 251 is connected to a conductor 129 that also is connected to one terminal of a resistor 245; the other terminal of the resistor 245 is connected by the conductor 104 to one terminal of a resistor 244; and the other terminal of the resistor 244 is connected to the conductor 243 to which is supplied the potential on the main conductor L1 when the circuit network is in its start position. The other terminal of the primary winding 251 is connected by the conductor N to ground potential. One terminal of the secondary winding 252 is connected to the B− potential on a conductor 254 and the other terminal of the secondary winding 252 is connected to a conductor 255. The B− conductor 254 is connected to the device 200 via a high impedance resonant circuit provided in an upper coupling structure 380 to be described more fully hereinafter, the coupling structure 380 providing a parallel reactive and capacitive impedance that prevents transmission of RF energy into the conductor 254. The conductor 255 is likewise connected to the device 200 via a high impedance resonant circuit provided in a lower coupling structure 390 to be described more fully hereinafter, the coupling structure 390 providing a parallel reactive and capacitive impedance that prevents transmission of RF energy into the conductor 255. By the above connections the B− potential is applied to the cathode 213 of the device 200 and the operating potentials for the heater 214 are applied thereto without introduction of RF energy into the transformer 250 and into the voltage doubler and rectifier circuit 230.

Further, the circuit network comprises a thermistor 260, the thermistor 260 being a resistive element characterized by a high negative temperature coefficient of resistance, the thermistor 260 more specifically being of the self-heating type. One terminal of the thermistor 260 is connected to ground potential by the neutral conductor N and the other terminal is connected to a conductor 261. Disposed in parallel with the thermistor 260 is a resistor 262 having one terminal grounded by the neutral conductor N and having the other terminal connected to the conductor 261.

In the start condition of the voltage doubler and rectifier circuit 230, it is desired to connect the thermistor 260 and the resistor 262 to the input terminal 232 to which is connected a conductor 263, and to this end a marginal control relay 270 has been provided. One terminal of the control relay 270 is connected by the neutral conductor N to ground potential and the other terminal thereof is connected to a conductor 279. There is associated with the relay 270 a first pair of switch springs 271, 272 and a second set of switch springs 273, 274, 275 and a third set of switch springs 276, 277 and 278. The switch spring 271 terminates the conductor 129; the switch spring 272 terminates the conductor 243; the switch spring 273 terminates a conductor 128; the switch spring 274 terminates the conductor 261; the switch spring 275 terminates a conductor 263; the switch spring 276 terminates the conductor 186; the switch spring 277 terminates a conductor 175; and the switch spring 278 terminates a conductor 190. When the relay 270 is in the de-energized position illustrated in FIG. 8, the switch springs 271, 272 are closed, thus to interconnect the conductors 129 and 243 and as a consequence shorting out the resistors 244, 245. The switch springs 274, 275 are closed, thus interconnecting the conductors 261 and 263 to connect the thermistor 260 and the resistor 262 to the input terminal 232. The switch springs 277, 278 are closed and interconnect the conductors 185 and 190.

The control relay 270 is further connected by the conductor 279 in a circuit that includes a thermal protective device 280 and a magnetic switch 285. More specifically, the device 280 is in the form of a bimetallic member having one terminal 281 thereof connected to the conductor 279 and having a cooperating switch spring 282. The switch spring 282 is connected by a conductor 283 to one terminal of the magnetic switch 285 and the other terminal of the magnetic switch 285 is connected to the conductor 243. The device 280 is physically associated with one of the cooling fins 218 on the crossed-field discharge device 200, the bimetallic member of the device 280 being in contact with the switch spring 282 so long as the operating temperature of the device 200 is in a safe range, and the bimetallic member 280 moving away from the contact 282 when the temperature of the device 200, and specifically the cooling fin 218 thereof, rises above a predetermined value. The magnetic switch 285 is further physically positioned so that a portion of the magnetic flux from the field coils 220a and 220b passes therethrough; the switch 285 is of the type which is normally open and is closed when the magnetic field associated therewith reaches a predetermined strength, after which the switch 285 closes, thereby to connect the conductors 243 and 283 therethrough.

The circuit network further includes a connection from the main conductor L2 to a thermal protective device in the form of a fuse 135, one terminal of the fuse 135 being connected to the conductor L2 and the other terminal of the fuse 135 being connected by a conductor 136 to one terminal of a resistor 137, the other terminal of the resistor 137 being connected to the conductor 128.

Finally, there is provided about the crossed-field discharge device 200 a bypass capacitor 290 having one terminal thereof connected to the conductor 224 and having the other terminal thereof connected to the conductor 216, whereby one terminal of the capacitor 290 is connected via the conductor 244 to the anode 212 of the device 210 and the other terminal of the capacitor 290 is connected by the conductor 216 to the cathode 213 of the device 210.

Considering the general mode of operation of the voltage doubler and rectifier circuit 230 in conjunction with the power selector switch 110, it is noted that when the power selector switch 110 occupies its "HI" position, the line conductor L1 is connected via the closed switch springs 106, 107, the conductor 108 and the closed switch springs 117, 118 to the conductor 127, and the line conductor L2 is connected via the switch springs 119, 120 to the conductor 128. On the other hand, when the power selector switch 110 occupies its "LO" position, the line conductor L2 is connected via the fuse 135 and the resistor 137 to the conductor 128. The conductor 127 upon actuation of the timer 130 is connected via the closed switch springs 182, 183 to the conductor 186 that is connected via the fuse 246, the fuse 238 and the surge resistor 237 to the input terminal 231 of the voltage doubler and rectifier circuit 230. At this time the other input terminal 232 is connected via the conductor 263, the closed switch springs 274, 275, the conductor 261, the thermistor 260 and the resistor 261 to the neutral conductor N that is grounded. Thus, when the power selector 110 occupies either its "HI" position or its "LO" position, 118 volts A.C. may be impressed between the input terminals 231 and 232 of the voltage doubler and rectifier circuit 230.

When the 118 volts A.C. voltage is applied across the input terminals 231 and 232, the various circuit components are in the "start condition" and/or the "start position" thereof. More particularly, the thermistor 260 is cold, whereby to present a very high resistance, so that the resistance between the conductor 261 and ground is essentially the resistance of the resistor 262; the conductor 261 is connected in series with the input terminal 232 via the closed switch springs 274, 275 and the conductor 263. The switch springs 271, 272 are closed, whereby the resistors 244, 245 are shorted out, thereby to apply the full 118 volt A.C. potential across the primary winding 251 of the heater transformer 250. As a result, the maximum energizing potential for the cathode heater 214 is applied thereto, whereby to begin heating of the cathode 214, and specifically, the electron emissive coating thereon. Due to the relatively high impedance imparted to the circuit by the resistor 262, a reduced output potential is provided between the output terminals 233 and 234 of the circuit 230, thereby to apply a reduced B+ potential across the device 200, and specifically between the anode 212 and the cathode 213 thereof; as a consequence, there will not be sufficient anode to cathode potential in the device 200 to destroy the cathode 213 by removing therefrom the emissive material prior to the heating thereof to the proper operating temperature.

As the cathode 213 heats, the device 200 becomes conductive and a current flows therethrough and through the circuit 230; since the thermistor 260 is in series with at least a portion of the current flowing through the circuit 230 and the current flowing through the device 200, the thermistor heats and the resistance thereof decreases; as the resistance of the thermistor 260 decreases, the total resistance between the conductor 261 and ground decreases, and finally the resistance of the thermistor 260 is less than 1 ohm, whereby effectively to remove the impedance between the conductor 261 and ground potential from the circuit 230. As a result, the proportion of the potential within the rectifier circuit 230 appearing at the output terminals 233, 234 rises since substantially no part thereof appears across the resistance between the conductor 261 and ground potential. From the above it will be seen that the impedance between the conductor 261 and ground potential and therefore the impedance in the input to the rectifier circuit 230 continually decreases and in a manner proportional to the total conduction of the energy through the device 200, the thermistor 260 and the resistor 262 being in series with at least a portion of the energy conducted through the device 200.

When the conduction of current through the device 200 rises to a predetermined value, the magnetic field about the field coils 220a and 220b rises to the predetermined strength that causes actuation of the magnetic switch 285. Closure of the magnetic switch 285 completes a circuit for the control relay 270 as follows: from the neutral conductor N through the winding of the relay 270, and via the conductor 279, the bimetallic member 280, the switch spring 282, the conductor 283, the magnetic switch 285, the conductor 243 and the fuse 244 to the conductor 186 on which appears the 118 volt A.C. potential. Closure of the magnetic switch 285 accordingly energizes the control relay 270; actuation of the control relay 270 opens the switch springs 271, 272, thus to remove the short around the resistors 244, 245 in series with the primary winding 251 of the heater transformer 250; opens the switch springs 274, 275 and closes the switch springs 273, 274, thus to connect the potential on the conductor 128 to the input terminal 232 of the voltage doubler and rectifier circuit 230; and opens the switch springs 277, 278 and closes the switch springs 276, 278 to connect the conductor 186 to the conductor 190, thus to commence operation of the timer motor 140.

If the power selector switch 110 is in the "HI" position, a 236 volt A.C. potential is applied between the input terminals 231 and 232; more specifically, the main conductor L1 is connected via the closed switch springs 106, 107, the conductor 108, the closed switch springs 117, 118, the conductor 127, the closed switch springs 182, 183, the conductor 186, the fuse 246, the conductor 243, the fuse 238 and the surge resistor 237 to the input terminal 231 of the circuit 230; the main line conductor L2 is connected via the closed switch springs 119, 120, the conductor 128, the closed switch springs 273, 275, and the conductor 263 to the input terminal 232 of the circuit 230; as a consequence, the full 236 volt A.C. line potential is applied as an input to the voltage doubler and rectifier circuit 230. Also both the resistors 244 and 245 are connected in series with the primary winding 251 of the heater transformer 250, thereby materially to reduce the potential thereacross and to reduce the potential applied to the cathode heater 214 in the crossed-field device 200. Also, the switch springs 115, 116 are closed thus to apply operating potential to a conductor 103 that supplies operating potential for the blower motor 138 arranged to drive the fan 206 cooling the device 200 and a smoke eliminator 139 forming a part of the range 10, the blower motor 138 having one terminal connected to the conductor 103 and the other terminal connected to the neutral conductor N, and the smoke eliminator 139 having one terminal connected to the conductor 103 and the other terminal connected to the neutral conductor N.

On the other hand, if the power selector switch 110 is in the "LOW" position thereof, the input terminal 231 of the voltage doubler and rectifier circuit 230 is again connected to the main line conductor L1 while the input terminal 232 of the circuit 230 is connected to the main line conductor L2 through the dropping resistor 280; more specifically, a circuit can be traced from the line conductor L1 through the switch contacts 106, 107, the conductor 108, the closed switch springs 125, 126, the conductor 127, the closed switch springs 182, 183, the conductor 186, the fuse 246, the conductor 243, the fuse 238 and the surge resistor 237 to the input terminal 231; and a circuit can be traced from the line conductor L2 through the fuse 135, the conductor 136, the dropping resistor 137, the conductor 128, the closed switch springs 273, 275 and the conductor 263 to the other input terminal 232 of the circuit 230. The dropping resistor 137 decreases the applied potential to the voltage doubler and rectifier circuit 230, thereby to decrease the output D.C. voltage at the output terminals 233 and 234 thereof, thereby to decrease the potential applied to the crossed-field discharge device 200 and thus to lower the power output thereof. Also, the resistor 245 is shorted and thus to remove it from the input circuit for the primary winding 251 of the heater transformer 250. More specifically, the switch springs contacts 121, 122 are closed thus to connect the conductor 104 to the conductor 129, thus to short out the resistor 245; as a consequence, a slightly increased power is provided for the heater 214 when the device 200 is operated at low power. When in low power operation, i.e., when the power switch is in the "LO" position, the switch springs 123, 124 are closed to apply operating potential to the conductor 103 so as to operate the blower motor 138 and the smoke eliminator 139.

Further details of the construction and operation of the power supply for the electric heating units 36 and 37 can be found in the aforementioned copending application Ser. No. 181,144, the disclosure of which is incorporated herein by reference; and further details of the construction and operation of the generator 100 for the crossed-field discharge device 200 can be had by reference to the copending application of James E. Staats, Ser. No. 569,006 filed July 27, 1966, the disclosure of which is incorporated herein by reference.

An important feature of the present invention resides in the construction and connection of the transmission line 300 interconnecting the crossed-field discharge device 200 and the liner 20, a detailed description of the transmission line 300 being now presented with particular reference to FIGS. 3 through 6 of the drawings. The crossed-field discharge device 200 is provided with a magnet yoke 226 at the upper end thereof which connects to the anode 212 and forms an outer conductor and an output terminal for the device 200, the lower end of the magnet yoke 226 being more particularly connected to the anode 212 and the upper end extending upwardly through the field winding 220b and being connected to a magnet flange 227. The lower end of the device 200 is likewise provided with a magnet yoke 228 having the upper end thereof connected to the anode 212 and the other end extending downwardly through the field winding 220a and being connected at the lower end to a magnet flange 229. The cathode 213 of the device 200 has connected thereto a stud 381 forming a part of the upper coupling structure 380, the stud 381 and the magnet yoke 226 forming a coaxial output connection for the device 200.

Referring specifically to FIG. 4, it will be seen that the output from the other end of the transmission line 300 is coupled to the antenna 301 disposed in the heating cavity 21, the antenna 301 being essentially a rod having a threaded stud 302 at one end thereof, the antenna 301 extending into the cavity 21 a short distance below the top wall 22 and essentially midway between the side walls 25, see FIG. 2. The stud 302 extends into a complementarily threaded opening at the end of a rod 317 forming an inner conductor that extends into the cavity 21, the conductor 317 being held in position by a bracket 304 and a cooperating electrical insulator 308. More specifically, the bracket 304 includes an annular mounting flange 305 which is suitably secured as by welding to the rear wall 24 of the liner 20 and disposed about an opening 24a therein, the flange 305 in turn carrying a forwardly directed annular flange 306 terminating in an inturned holding flange 307 disposed against the forward surface of the insulator 308.

A top section 310 of the transmission line 300 is formed by a first tube 311 forming the outer conductor therefor and the inner conductor 317. The forward edge of the tube 311 has an outwardly directed flange 312 thereon which is suitably secured as by welding on the rear side of the rear wall 24 and surrounding the opening 24a therein and assisting in holding the insulator 308 in the operative position in cooperation with the bracket 304.

The rear end of the tube 311 is received in a T 320, the T 320 including a body 321 and a pair of arms 322 and 324 and a leg or arm 326 all provided with a seat or shoulder 323, 325 and 327, respectively, internally thereof. The rear end of the tube 311 is disposed within the arm 322 and in telescopic relationship therewith and has the rearmost end thereof spaced slightly forwardly with respect to the shoulder 323, an insulator 318 being disposed between the tube 311 and the shoulder 323 and held in position thereby, the insulator 318 having a central opening therein receiving the inner conductor 317 therethrough. Preferably the outer end of the arm 322 has longitudinally extending slots (not shown) formed therein and receives therearound a clamp 315 having associated therewith a screw 316 (see FIG. 1) for tightening the clamp 315 about the outer end of the arm 322, thus releasably to clamp the arm 322 about the rear end of the tube 311 to hold it in the operative position. It further is pointed out that the arm 322 extends through an opening 46 in the baffle wall 42, whereby the major portion of the T 320 is disposed to the rear of the baffle wall 42 and thus in the rear machinery compartment 45, whereby the T 320 is accessible for service and maintenance through the removable panel 15 (see FIG. 1 also). The other arm 324 carries on the outer end thereof a dust cover 328 that serves to close the same to prevent the entry of dust, dirt, water and the like into the interior of the T 320.

A rear section 330 for the transmission line 300 is provided by an outer tube 331 and an inner conductor 332 disposed within the outer tube 331. The upper end of the tube 331 extends into the lower arm or leg 326 of the T 320 and is spaced from the shoulder 327 thereof, an insulator 334 being disposed between the upper end of the tube 331 and the shoulder 327 and held in position therebetween. The insulator 334 has an opening therethrough to receive the upper end of the inner conductor 332, the inner conductor 332 having an upper flattened end 333 having an opening therein receiving therethrough a screw 319 engaging in a complementarily threaded opening in the rear end of the rod 317, whereby to interconnect the rear end of the inner conductor 317 and the upper end of the inner conductor 332. There further is provided around the lower portion of the leg 326 one of the clamps 315, the lower end of the leg 326 preferably being slotted (not shown) whereby tightening of the screw 316 associated with the clamp 315 serves to tighten the leg 326 about the upper end of the tube 331 releasably to hold the parts in the assembled telescoping positions.

The lower end of the rear transmission line section 330 is received in a T 340, the T 340 including a body 341 having a pair of arms 342 and 344 and a leg or arm 346 each provided with a cooperating internal seat or shoulder 343, 345 and 347, respectively. More particularly, the leg 346 is positioned upwardly and receives telescopically therein the lower end of the tube 331, the lower end of the tube 331 being spaced upwardly with respect to the seat 347 to receive therebetween an insulator 336 to mount the same within the T 340, the insulator 336 having an opening therethrough receiving the lower end of the inner conductor 332 therethrough. The outer end of the leg 346 is preferably slotted (not shown) and receives therearound one of the clamps 315, whereby by means of the associated screw 316 the clamp 315 can be tightened about the outer end of the leg 346 to clamp it against the lower end of the tube 331 releasably to hold the parts in the assembled position. The arm 344 preferably carries thereon a dust cover 348, which cover 348 serves to prevent the entry of dust, dirt, water and other debris into the interior of the T 340 and the transmission line 300.

There is operatively associated with the other arm 342 of the T 340 a rear bottom section 350 of the transmission line 300, the rear bottom section 350 including a tube 351 as the outer conductor and a tube 354 as the inner conductor spaced therefrom and electrically insulated therefrom. The tube 351 further has a portion 352 of reduced diameter that extends into and is telescopically associated with the arm 342 of the T 340, the inner end of the tube 351 being spaced from the shoulder 343 and receiving therebetween an insulator 338 that is held in position thereby. One of the clamps 315 is disposed about the outer end of the arm 342 which is preferably slotted (not shown), whereby by means of the associated screw 316 the clamp 315 can be tightened to press the arm 342 about the adjacent end 352 of the tube 351 releasably to hold the parts in the assembled position. The insulator 338 has an opening therein receiving therethrough the inner conductor 354, the rear end of the inner conductor 354 carrying a plug 355 secured thereto and having a threaded opening therein, the lower end of the rear inner conductor 332 having a flattened portion as at 335 having an opening therein receiving a screw 337 that threadedly engages the opening in the plug 355, thus to interconnect the lower end of the inner conductor 332 and the rear end of the inner conductor 354. The forward end (the end disposed to the left in FIG. 4) of the tube 351 is outwardly flared as at 353, and the forward end of the inner conductor 354 is outwardly flared as at 356, all to permit ready assembly with other portions of the transmission line 300 as will be described more fully hereinafter.

The rear bottom section 350 cooperates with and is telescopically associated with a front bottom transmission line section 360, the front bottom section 360 including a tube 361 serving as the outer conductor and an inner conductor 362 disposed within the tube 361 and spaced therefrom and electrically insulated therefrom. The tube 361 has an internal diameter slightly less than the internal diameter of the main portion of the tube 351 whereby the rear end of the tube 361 is telescopically received therein, a layer of insulation 221 being disposed therebetween to provide a capacitive coupling at RF frequencies. The inner conductor 362 has the rear end reduced in diameter to provide a probe 363 having a rounded end 364, the probe 363 having an external diameter slightly less than the internal diameter of the inner conductor 354 whereby the rear end of the probe 363 can be disposed therein, a layer of insulation 222 being provided therebetween and forming therewith a capacitive coupling at RF frequencies. An annular insulator 357 is disposed about the probe 363 adjacent to the juncture thereof with the main portion of the inner conductor 362 and more particularly bearing against a shoulder 365 formed thereat, the flared end 356 of the inner conductor 354 pressing against the rear end of the insulator 357 thereby positively to position the parts one with the other.

The forward end of the rear bottom transmission line section 350 is coupled to the crossed-field discharge device 200 by means of a T 370, the T 370 including a body 371 having a pair of arms 372 and 374 and a leg or arm 376 each provided with a cooperating internal seat or shoulder 373, 375 and 377, respectively. More particularly, the leg 376 is positioned downwardly and is telescopically received in the upper end of the magnet yoke 226 for coupling thereto, the T 370 forming a part of the upper coupling structure 380. Also forming a part of the upper coupling structure 380 is a bullet 382 receiving into the lower end thereof the stud 381 that is coupled to the cathode 213, the bullet 382 having a shoulder 383 thereon that cooperates with the shoulder 377 to hold in operative position an insulator 378 that serves to center the bullet 382 with respect to the leg 376. The upper end of the bullet 382 carries an internally threaded eye 384 through which is threadedly inserted a stud 366, the rear end of the stud 366 being threadedly received in a complementarily threaded opening in the inner conductor 362, thereby to support the forward end of the inner conductor 362, there also being provided therearound a supporting insulator 367. The forward end of the tube 361 is telescopically received within the leg 372 and is spaced a short distance away from the shoulder 373, thereby to clamp the insulator 367 in the operative position therebetween. Preferably the forward end of the tube 361 is fixedly secured as by soldering to the arm 372.

A decoupling structure is carried by the other arm 374 of the T 370, and more particularly comprises an inner conductor 385 having a rear end connected to the forward end of the stud 366 by means of a threaded connection therebetween, the inner conductor 385 having a reduced forward portion 386. Fixedly mounted on the arm 374 and telescopically received there in is an outer conductor 387 within which is disposed an insulating sleeve 379. Disposed within the insulating sleeve 379 is a cup-like outer conductor 388 having the outer end closed by a wall 389, a screw passing through an opening in the outer wall 389 and engaging in a threaded opening in the forward end of the reduced portion 386 of the inner conductor fixedly to interconnect the parts and to provide the input terminal 216.

In the transmission line 300, the bullet 382, the T 370, the inner conductor 362 and the tube 361 are shaped and arranged to provide a quarter wave transformer section at the frequency of operation of the device 200; more particularly, the shouldered portions of the bullet 382 and the conductor 362 have dimensions such that the impedance of the device 200 is matched to the impedance of the transmission line 300 that is in turn matched to the impedance of the heating cavity 21. Likewise, the bullet 382, the inner conductor 385, the outer conductor 387 and the outer conductor 388 are all shaped and arranged to provide a quarter wave transformer section that assists in decoupling RF energy from the input terminal 216 to prevent the propagation of RF energy into the power supply. Furthermore, the inner conductor 385, the outer conductor 387, the insulator 379, the outer conductor 388 and the end wall 389 cooperate to provide the parallel capacitive impedance and reactive impedance diagrammatically illustrated within the box designated 380 in FIG. 8. To this end the distance between the inner surface of the end wall 389 and the center of the bullet 382 is preferably equivalent to slightly less than one-quarter wavelength of the frequency of operation of the device 200, and the conductors 387 and 388 overlap a distance equivalent to one-eighth wavelength of the frequency of operation of the device 200. It is noted that the stepped configuration of the inner conductor 385 permits a shorter mechanical connection while maintaining an electrical characteristic equivalent to slightly less than one-quarter wavelength of the operating frequency of the device 200.

Because the potentials for operating the device 200 are derived from the voltage doubler and rectifier circuit 230, neither the stud 381 forming the inner conductor nor any of the parts such as the yoke 226 and the T 370 forming the outer conductor of the coupling structure 380 can be grounded. However, it is highly desirable to ground the portion of the transmission line 300 disposed to the rear of the rear baffle 40, and to this end the capacitive coupling at 221 and 222 has been provided between the rear bottom transmission line portion 350 and the front bottom transmission line portion 360. Furthermore, the outer conductors 351 and 361 overlap a distance equivalent to one-quarter wavelength at the frequency of operation of the device 200 and the inner conductor 354 overlaps the inner conductor 362 a distance equivalent to one-quarter wavelength of the frequency of operation of the device 200, thereby to provide a filter for the second and higher harmonics as well as providing a D.C. insulation between the parts named. Accordingly, the outer conductor 351 can be grounded as on the casing 11 and the baffle member 40, thereby to present only grounded parts to workmen gaining access to the rear machinery compartment 45 through the removable panel 15.

It further is pointed out that the T 320, the entire rear transmission line section 330, T 340 and the rear bottom transmission line section 350 form a removable transmission line assembly that can be bodily moved rearwardly through the opening provided by the removable panel 15 for maintenance and repair of the parts. Such movement of the transmission line assembly rearwardly is accomplished by simply loosening the clamp 315 about the leg 322 which frees the T 320 from the tube 311 and removing the screw 319 to free the inner conductor 332 from the inner conductor 317. Due to the telescoping arrangement of the bottom transmission line sections 350 and 360, there is no need to remove or disconnect any parts other than by the relative sliding movement of the sections 350 and 360 with respect to each other. Reassembly of the parts is facilitated by the flared ends 353 and 356 on the tubular conductors 351 and 354, respectively, whereby to facilitate re-engagement over the conductors 361 and 363, respectively. It further is necessary to hold the removable transmission line assembly in the assembled position, and to this end a spring 349 under tension has been provided interconnecting the T 340 and the baffle wall 42, thus continually to urge the removable transmission line assembly into the assembled operative position.

Another important feature of the transmission line 300 resides in the fact that the tubes 311, 331, 351, 361 and 387 can all be formed essentially of standard tubing shaped as required and cut to length, the tubing preferably being formed of copper, brass or other good electrically conductive metal. The inner conductors 332 and 354 also can be formed essentially of standard tubing shaped as required and cut to length, this tubing also preferably being formed of copper, brass or the like. The T's 320, 340 and 370 are also of standard configuration and are all identical one to the other, the T's preferably being formed of copper, brass or other material having good electrical conductivity. Finally, the insulators 318, 334, 336, 338, 357, 367 and 378 are preferably all formed of a polytetrafluoroethylene resin such as that sold under the trademark "Teflon."

The lower coupling structure 390 cooperates with the magnet yoke 228 serving as an outer conductor of a transmission line and a tube 391 connected at the upper end to one end of the heater 214 and serving as an inner conductor of a coaxial transmission line, the lower end of the tube 391 carrying an insert 392 therein and receiving the screw 219 serving as as input terminal. Disposed within and essentially lining the magnet yoke 228 is a sleeve 393 of electrically insulating material, an inner conductor 394 being disposed against the sleeve 393 and telescopically overlapping a portion of the yoke 228 and having the outer end thereof closed by an end wall 395, the end wall 395 having an opening therethrough receiving the shank of the screw 219 that engages in a complementarily threaded opening in the insert 392. The yoke 288, the tube 391, the insulating sleeve 393, the inner conductor 394 and the end wall 395 cooperate to provide the parallel resonant circuit including a reactive impedance and a capacitive impedance enclosed within the box designated 390 in FIG. 8, the structure comprising a high impedance to RF energy to prevent propagation thereof onto the conductor 255. More specifically, the distance between the lower adjacent end of the anode 212 and the inner surface of the end wall 395 is equivalent to slightly less than a quarter wavelength at the operating frequency of the device 200, and the yoke 228 and the inner conductor 394 telescopically overlap a distance equivalent to one-eighth wavelength at the operating frequency of the device 200.

From the above it will be seen that the liner 20 is effectively isolated from the bottom machinery compartment 35 and the rear machinery compartment 45 by the baffle members 30 and 40, respectively, thereby to provide a more uniform distribution of heat within the liner 20 and thus to permit good cooking therein. The entire generator 100 including the cross-field discharge device 200 and the voltage doubler and rectifier circuit 230 therefor are housed within the bottom machinery compartment 35 which provides a protecting housing therefor. The fan 206 serves to cool all of the electrical components of the generator 100 by drawing air inwardly through the screen 17 into the bottom machinery compartment 35 and across the crossed-field discharge device 200 and outwardly through the screen 18. The stream of air thus created is effectively prevented from coming into contact with the liner 20 due to the presence of the baffle members 30 and 40. Finally, the improved couple structure and transmission line 300 has been provided, the major portion of which can be readily removed from the assembled relation with the liner 20 and the device 200 for repair and service purposes through the removable panel 15, and can thereafter be readily reassembled therewith.

From the above it will be seen that there has been provided an improved electronic heating apparatus 10 and microwave coupling structure 380–390 and improved transmission line 300 therefor which fulfill all of the objects and advantages set forth above.

While there has been described what is at present considered to be the preferred embodiment of the invention, it will be understood that various modifications can be made therein, and it is intended to cover in the appended claims all such modifications as fall within the true spirit and scope of the invention.

What is claimed is:

1. An electronic heating apparatus comprising an upstanding box-like metal casing, a box-like metal liner disposed in the upper portion of said casing and defining a cooking cavity, baffle structure disposed in said casing and spaced from said liner and extending across said casing and cooperating therewith to define a bottom apparatus compartment below said liner and a rear apparatus compartment behind said liner, a generator disposed in said bottom apparatus compartment for supplying ultra-high frequency electromagnetic wave energy, a transmission line interconnecting said generator and said cooking cavity and extending through said bottom apparatus compartment and said rear apparatus compartment, and means for forcing a stream of air into said casing and through said bottom apparatus compartment and across said generator and out of said casing to effect cooling of said generator, said baffle structure shielding said liner from the stream of air in said bottom apparatus compartment to facilitate the maintenance of a more nearly uniform temperature distribution in said cooking cavity.

2. The electronic heating apparatus set forth in claim 1, wherein said generator includes a cross-field electron discharge device and a voltage doubler and rectifier circuit therefor, said baffle structure is formed of metal, and said casing and said baffle structure completely surround said generator and are grounded and provide a protective housing for said generator.

3. The electronic heating apparatus set forth in claim 1, wherein said means for forcing a stream of air into said casing includes a first reticulated metal member in the lower portion of said casing on one side of said generator for admitting a stream of air therethrough, a second reticulated metal member in the lower portion of said casing on the other side of said generator for passing a stream of air therethrough, and a fan mounted between said reticulated members for drawing a stream of air through said first reticulated member and passing the stream of air over said generator and discharging the stream of air through said second reticulated member.

4. An electronic heating apparatus comprising an upstanding box-like metal casing, a box-like metal liner disposed in the upper portion of said casing and defining a cooking cavity, a first baffle member disposed below said liner and spaced therefrom and extending across said casing to define a bottom apparatus compartment below said liner, a second baffle member disposed behind said liner and spaced therefrom and extending across said casing and downwardly to said first baffle member to define a rear apparatus compartment behind said liner, a generator disposed in said bottom apparatus compartment for supplying ultra-high frequency electromagnetic wave energy, a transmission line interconnecting said generator and said cooking cavity and including a top section coupled to said cooking cavity and a bottom section coupled to said generator and a rear section interconnecting said top and bottom sections, said top section extending from said cooking cavity rearwardly behind said second baffle member and said bottom section extending rearwardly behind said second baffle member and said rear section being disposed behind said second baffle member, and means for forcing a stream of air into said casing and through said bottom apparatus compartment and across said generator and out of said casing to effect cooling of said generator, said baffle members shielding said liner from the stream of air to facilitate the maintenance of a more nearly uniform temperature distribution in said cooking cavity.

5. The electronic heating apparatus set forth in claim 4, wherein said first and second baffle members are formed of metal, and said first baffle member extends rearwardly to but is spaced from said second baffle member to minimize transfer of heat therebetween.

6. The electronic heating apparatus set forth in claim 4, whrein said second baffle member extends downwardly below said first baffle member, both the top and bottom sections of said transmission line extend rearwardly through said second baffle member.

7. The electronic heating apparatus set forth in claim 4, wherein the top section of said transmission line is coupled to said cooking cavity adjacent to the upper portion thereof at the rear thereof and generally centrally laterally thereof, the bottom section of said transmission line is disposed laterally toward one side of said bottom apparatus compartment, and the rear section of said transmission line interconnects said top and bottom sections of said transmission line.

8. An electronic heating apparatus comprising an upstanding box-like metal casing having a removable closure member in the rear thereof, a box-like metal liner disposed in the upper portion of said casing and defining a cooking cavity, said casing and said liner cooperating to define a bottom apparatus compartment below said liner and a rear apparatus compartment behind said liner, a generator disposed in said bottom apparatus compartment for supplying ultra-high frequency electronic wave energy, and a transmission line interconnecting said generator and said cooking cavity and including a top section coupled to said cooking cavity and a bottom section coupled to said generator and a rear section interconnecting said top and bottom sections, said top transmission line section including a first portion mounted on said liner and a second portion telescopically associated with said first portion and extending rearwardly therefrom into said rear apparatus compartment, said bottom transmission line section including a first portion mounted on said generator and a second portion telescopically associated with said first portion and extending rearwardly therefrom into said rear apparatus compartment, said rear transmission line section being connected to said second portions of said top and bottom transmission line sections to provide therewith a removable transmission line assembly, whereby upon the removal of said removable closure member subsequent rearward movement of said removable transmission line assembly serves to disconnect said removable transmission line assembly from said first portion of said top and bottom transmission line sections.

9. The electronic heating apparatus set forth in claim 8, wherein said transmission line is of the coaxial conductor type including an outer conductor within which is disposed an inner conductor insulated therefrom.

10. The electronic heating apparatus set forth in claim 8, wherein said bottom transmission line section is of the coaxial conductor type including an outer conductor and an inner conductor disposed therein and insulated therefrom, said outer conductor including a first tubular portion mounted on said generator and a second tubular portion telescopically overlapping said first tubular portion and extending rearwardly into said rear apparatus compartment, said inner conductor including a first portion mounted on said generator and a second tubular portion telescopically overlapping said first portion and extending rearwardly into said rear apparatus compartment, the forward end of said second outer tubular portion and the forward end of said second inner tubular portion being outwardly flared to facilitate insertion thereof over the associated first outer portion and first inner portion respectively.

11. The electronic heating apparatus set forth in claim 10, wherein said outer conductor portions and said inner conductor portions telescopically overlap a distance equivalent to one-quarter wavelength of the frequency of operation of said generator and said overlapping portions are insulated from each other to provide a filter for the second harmonic of the operating frequency of said generator.

12. The electronic heating apparatus set forth in claim 8, and further comprising means resiliently urging said removable transmission line assembly into the assembled position with respect to the first portions of said top and bottom transmission line sections.

13. The electronic heating apparatus set forth in claim 12, wherein said means comprises a spring interconnecting said removable transmission line assembly and said casing.

14. An electronic heating apparatus comprising an upstanding box-like metal casing having a removable closure member in the rear thereof, a box-like metal liner disposed in the upper portion of said casing and defining a cooking cavity, baffle structure disposed in said casing and spaced from said liner and extending across said casing and cooperating therewith to define a bottom apparatus compartment below said liner and a rear apparatus compartment behind said liner, said baffle structure shielding said liner from the conditions in said apparatus compartments, said removable closure member in the rear of said casing providing access to said rear apparatus compartment, a generator disposed in said bottom apparatus compartment for supplying ultra-high frequency electronic wave energy, and a transmission line interconnecting said generator and said cooking cavity and including a top section coupled to said cooking cavity and a bottom section coupled to said generator and a rear section interconnecting said top and bottom sections, said top transmission line section including a first portion mounted on said liner and a second portion telescopically associated with said first portion and extending rearwardly through said baffle structure and into said rear apparatus compartment, said bottom transmission line section including a first portion mounted on said generator and a second portion telescopically associated with said first portion and extending rearwardly through said baffle structure and into said rear apparatus compartment, said rear transmission line section being connected to said second portions of said top and bottom transmission line sections to provide therewith a removable transmission line assembly, whereby upon the removal of said removable closure member subsequent rearward movement of said removable transmission line assembly serves to disconnect said removable transmission line assembly from said first portions of said top and bottom transmission line sections.

15. An electronic heating apparatus comprising an upstanding box-like metal casing having a removable closure member in the rear thereof, a box-like metal liner disposed in the upper portion of said casing and defining a cooking cavity, said casing and said liner cooperating to define a bottom apparatus compartment below said liner and a rear apparatus compartment behind said liner, a generator disposed in said lower apparatus compartment for supplying ultra-high frequency electromagnetic wavelength, and a coaxial transmission line interconnecting said generator and said cooking cavity and including a top section coupled to said cooking cavity and a bottom section coupled to said generator and a rear section interconnecting said top and bottom sections, said top section including a first tube connected to said liner and extending rearwardly therefrom and providing an outer conductor and a first inner conductor disposed within said first tube and insulated therefrom and having the forward end thereof coupled to said cooking cavity, said bottom section including a second tube extending rearwardly from said generator and providing an outer conductor and a second inner conductor disposed within said second tube and insulated therefrom and having the forward end thereof coupled to said generator, a third tube telescopically overlapping said second tube and extending rearwardly therefrom and providing an outer conductor, a third inner conductor disposed within said third tube and insulated therefrom and telescopically overlapping said second inner conductor, said rear section including a fourth tube disposed in said rear apparatus compartment and providing an outer conductor and a fourth inner conductor disposed within said fourth tube and insulated therefrom and having the upper end thereof connected to the rear end of said first inner conductor and having the lower end thereof connected to the rear end of said third inner conductor, a first fixture having two legs telescopically overlapping respectively the rear end of said first tube and the upper end of said fourth tube and covering the connection between said first and fourth inner conductors, a second fixture having one leg coupled to said generator and another leg telescopically overlapping the forward end of said second tube and covering the coupling between said second inner conductor and said generator, a third fixture having two legs telescopically overlapping respectively the rear end of said third tube and the lower end of said fourth tube and covering the connection between said third and fourth inner conductors, and clamping structures detachably securing said first and third and fourth tubes to the adjacent ones of said legs.

16. The electronic heating apparatus set forth in claim 15, wherein said tubes and said fixtures are formed of copper, and said first and second and fourth tubes have the same diameter and cross sectional configuration.

17. The electronic heating apparatus set forth in claim 15, wherein said fixtures are all of identical construction.

18. The electronic heating apparatus set forth in claim 15, wherein the forward ends of said third tube and said third inner conductor are outwardly flared to facilitate insertion thereof over the rear ends respectively of said second tube and said second inner conductor.

19. The electronic heating apparatus set forth in claim 15, wherein electrical insulation is provided between said second and third tubes and between said second and third inner conductors to prevent the transmission of DC potentials therebetween while coupling RF potentials therebetween, said second and third tubes and said second and third inner conductors both telescopically overlapping a length equivalent to one quarter wavelength of the frequency of operation of said generator to provide a second harmonic filter at the frequency of operation of said generator.

20. The electronic heating apparatus set forth in claim 15, and further comprising a quarter wave transformer coupling the output of said generator to said second inner conductor to match the impedance of said generator to said transmission line.

(References on following page)

References Cited

UNITED STATES PATENTS

| | | | |
|---|---|---|---|
| 3,081,392 | 3/1963 | Warner | 219—10.55 |
| 3,127,495 | 3/1964 | Polries et al. | 219—10.55 |
| 3,172,987 | 3/1965 | Fitzmeyer | 219—10.55 |
| 3,195,013 | 7/1965 | Thal | 219—10.55 |
| 3,321,605 | 5/1967 | Reker | 219—10.55 |

RICHARD M. WOOD, *Primary Examiner.*

L. H. BENDER, *Assistant Examiner.*